(12) United States Patent
Mallikarjunan

(10) Patent No.: US 12,415,632 B2
(45) Date of Patent: Sep. 16, 2025

(54) APPARATUS FOR AERIAL TRANSPORTATION OF PAYLOAD

(71) Applicant: Srinath Mallikarjunan, Chennai (IN)

(72) Inventor: Srinath Mallikarjunan, Chennai (IN)

(73) Assignee: Srinath Mallikarjunan, Chennai (IN)

( * ) Notice: Subject to any disclaimer, the term of this patent is extended or adjusted under 35 U.S.C. 154(b) by 0 days.

(21) Appl. No.: 18/404,175

(22) Filed: Jan. 4, 2024

(65) Prior Publication Data

US 2024/0140627 A1 May 2, 2024

Related U.S. Application Data

(63) Continuation-in-part of application No. 17/267,120, filed as application No. PCT/IN2019/050634 on Sep. 3, 2019, now abandoned.

(51) Int. Cl.
*B64U 30/24* (2023.01)
*B64U 10/11* (2023.01)
*B64U 10/16* (2023.01)

(52) U.S. Cl.
CPC .............. *B64U 30/24* (2023.01); *B64U 10/11* (2023.01); *B64U 10/16* (2023.01)

(58) Field of Classification Search
CPC ........ B64U 30/24; B64U 10/16; B64U 10/17; B64U 10/11
See application file for complete search history.

(56) References Cited

U.S. PATENT DOCUMENTS

| | | | |
|---|---|---|---|
| 2,695,674 A | * | 11/1954 | Kaman ................ B64C 27/615 244/17.11 |
| 7,118,340 B2 | | 10/2006 | D'Anna |
| 7,942,365 B2 | | 5/2011 | Palcic et al. |
| 8,418,959 B2 | | 4/2013 | Kang |

(Continued)

FOREIGN PATENT DOCUMENTS

| CN | 106741903 A | 5/2017 |
|---|---|---|
| DE | 10 2005 046 155 A1 | 4/2007 |

(Continued)

OTHER PUBLICATIONS

JP 2001071998 Translation (Year: 2001).*

(Continued)

*Primary Examiner* — Peter M Poon
*Assistant Examiner* — Marisa V Conlon
(74) *Attorney, Agent, or Firm* — Foley & Lardner LLP

(57) ABSTRACT

A vertical take-off and landing aircraft includes a primary rotor unit having a rotor axis, an upper rotor system, and a lower rotor system. The upper rotor system includes an upper swashplate configured to translate along the rotor axis and not configured to tilt relative to the rotor axis and a pair of top blades configured to rotate about the rotor axis. Translation of the upper swashplate causes a pitch of each of the top blades to change equally. The lower rotor system includes a lower swashplate configured to translate along the rotor axis and not configured to tilt relative to the rotor axis and a pair of bottom blades configured to rotate about the rotor axis. Translation of the lower swashplate causes a pitch of each of the bottom blades to change equally. The aircraft further includes a plurality of secondary rotors each having fixed-pitch rotor blades.

20 Claims, 16 Drawing Sheets

(56) References Cited

U.S. PATENT DOCUMENTS

| | | |
|---|---|---|
| 8,496,434 B2 | 7/2013 | Brunken, Jr. |
| 8,636,473 B2 | 1/2014 | Brunken, Jr. |
| 8,801,380 B2 | 8/2014 | Stille |
| 8,967,532 B2 | 3/2015 | Vialle |
| 9,193,454 B2 * | 11/2015 | Modrzejewski ...... B64C 27/605 |
| 9,677,466 B2 * | 6/2017 | Smaoui ................. B64U 50/19 |
| 9,902,493 B2 * | 2/2018 | Simon .................... B64U 30/24 |
| 10,160,538 B2 | 12/2018 | Wang et al. |
| 10,526,087 B2 | 1/2020 | He et al. |
| 10,625,855 B2 | 4/2020 | Deng et al. |
| 11,851,178 B2 * | 12/2023 | Beck ...................... B64U 50/14 |
| 11,926,443 B2 * | 3/2024 | Kastiel .................. B64U 10/14 |
| 2006/0102777 A1 | 5/2006 | Rock |
| 2012/0063897 A1 | 3/2012 | Brunken |
| 2013/0294912 A1 | 11/2013 | Brunken, Jr. |
| 2015/0197242 A1 | 7/2015 | Yamazaki |
| 2015/0285165 A1 | 10/2015 | Steinwandel et al. |
| 2020/0346746 A1 | 11/2020 | Duffy et al. |
| 2021/0309360 A1 * | 10/2021 | Mallikarjunan ........ B64C 27/80 |
| 2021/0323691 A1 * | 10/2021 | Foster .................... B64D 27/04 |
| 2023/0014461 A1 | 1/2023 | Nagase et al. |

FOREIGN PATENT DOCUMENTS

| | | | |
|---|---|---|---|
| GB | 0 617 290 A | 2/1949 | |
| JP | 2001071998 A * | 3/2001 | ............ B64C 27/14 |
| KR | 101853354 B1 | 5/2018 | |
| WO | WO-2010/134921 A1 | 11/2010 | |
| WO | WO-2023/197567 A1 | 10/2023 | |

OTHER PUBLICATIONS

International Search Report and Written Opinion issued in corresponding application No. PCT/IN2019/050634 dated Nov. 13, 2019.

US Final Office Action on U.S. Appl. No. 17/267,120 dated Aug. 4, 2023 (10 pages).

US Non-Final Office Action on U.S. Appl. No. 17/267,120 dated Apr. 25, 2023 (10 pages).

S. Mallikarjunan, Unmanned Dynamics, https://unmanned-dynamics.com/products (May 15, 2023) (last accessed Jan. 3, 2024) (3 pgs).

International Search Report and Written Opinion in PCT/IB2025/050085 Dated May 13, 2025 (15 pages).

* cited by examiner

APPARATUS FOR AERIAL TRANSPORTATION OF PAYLOAD

CROSS-REFERENCE TO RELATED PATENT APPLICATIONS

This application is a Continuation-In-Part of U.S. application Ser. No. 17/267,120, filed Feb. 9, 2021, which is a National Stage Entry of International Application No. PCT/IN2019/050634, filed Sep. 3, 2019, which claims priority to Indian Application No. 201821034204, filed Sep. 11, 2018, all of which are incorporated herein by reference in their entireties.

FIELD OF THE INVENTION

The present disclosure relates generally to payload transportation and more particularly, to an apparatus for an aerial transportation of the payload.

BACKGROUND OF THE INVENTION

With the advent of technology, the job of transporting payloads, that has been conventionally restricted to the land and the seas, has literally reached for the skies. Specialized contraptions are already available in the market that caters to transporting payloads of a spectrum as wide as pizzas to automobiles.

The apparatuses existing in the market, responsible for aerial transportation of payloads ranging from 10 to 100 kg have a limited flight time as these apparatuses employ lithium polymer batteries that have a small energy density. Further, these apparatuses use the same propellers for primary thrust and control in multi rotors. Moreover, the few devices presently available in the market are unable to transport payloads for extended periods of time and also incapable of hovering.

Accordingly, there exists a need to provide an apparatus for aerial transportation of a payload that overcomes the above mentioned drawbacks of the prior arts.

OBJECTS OF THE INVENTION

An object of the present invention is to provide a cost efficient and a safe apparatus for aerial transportation of payload.

Another object of the present invention is to provide an apparatus for aerial transportation of payload which is less demanding in terms of infrastructure requirements for take-off and landing.

SUMMARY OF THE INVENTION

Accordingly, the present invention provides an apparatus for an aerial transportation of a payload. In an embodiment, the apparatus is a drone. In another embodiment, the apparatus is a drone operating on a technology of a vertical take-off and landing.

The apparatus comprises a propeller unit, a gearbox, an engine, a clutch, a plurality of propellers and an electrical subsystem.

The propeller unit is used to provide a primary thrust to the apparatus. The propeller unit includes a pair of top blades and a pair of bottom blades. The pair of top blades and the pair of bottom blades are arranged in a coaxial counter-rotating configuration. The pair of top blades and the pair of bottom blades are respectively connected to the gearbox through two coaxial counter-rotating shafts. The top and bottom set of blades of the propeller unit are independently actuated and capable of only collective motion and are not capable of cyclic pitch control. This means that the top set of blades can pitch up or down by the same angle. Similarly the bottom set of blades can pitch up or down by the same angle (which can be a different angle compared to the top set of blades, since the top and bottom set of blades are independently actuated). There is no provision for cyclic control on the main rotors, meaning that the pitch angle of one top blade cannot be different than the pitch angle of the other top blade, and the pitch angle of one bottom blade cannot be different than the pitch angle of the other bottom blade. Such a configuration would not be stable or maneuverable if it were not for the plurality of electric rotors that provide roll and pitch control as described below.

An engine or electric motor can act as a prime mover and be used for driving the propeller unit through the gearbox. A clutch can be positioned between the engine and the gearbox. The clutch disengages in case of failure of the engine to facilitate auto-rotation thereby enabling a safe descent. The plurality of propellers is fitted around a body of the apparatus. The plurality of propellers fitted around the body of the apparatus is in a range of 3 to 16. The plurality of propellers is fixed-pitch propellers that are powered by a plurality of electric motors. The plurality of propellers is adapted to help in maneuvering and orientation control. The electrical subsystem consists of a battery and electronic speed controllers for controlling speed of the plurality of propellers. Specifically, the electrical subsystem is used to control roll and pitch control of the apparatus.

The present disclosure describes a vertical take-off and landing aircraft including a primary rotor unit having a rotor axis, an upper rotor system, and a lower rotor system. The upper rotor system includes a pair of top blades configured to rotate about the rotor axis, an upper rotor shaft extending along the rotor axis and configured to drive the rotation of the pair of top blades, an upper swashplate configured to translate along the rotor axis and not configured to tilt relative to the rotor axis, translation of the upper swashplate causing a pitch of each of the top blades to change equally, and an actuating rod extending along the rotor axis through the upper rotor shaft and configured to control the translation of the upper swashplate. The lower rotor system includes a lower swashplate configured to translate along the rotor axis and not configured to tilt relative to the rotor axis and a pair of bottom blades configured to rotate about the rotor axis, translation of the lower swashplate causing a pitch of each of the bottom blades to change equally. The aircraft further includes a plurality of secondary rotors each including fixed-pitch rotor blades. The aircraft may include a controller including a processor and a memory storing instructions that, when executed by the processor, cause the controller to control the translation of the upper swashplate and the lower swashplate to control thrust provided by the primary rotor unit and yaw of the aircraft. The instructions may further cause the controller to independently control the rotational speeds of each secondary rotor to control pitch and roll of the aircraft. The instructions may further cause the controller to control the primary rotor unit to rotate the pair of top blades and the pair of bottom blades at a constant speed. The lower rotor system may include a lower rotor shaft extending along the rotor axis and configured to drive the rotation of the pair of bottom blades, the lower swashplate arranged around the lower rotor shaft, and the upper rotor system may include an upper rotor shaft extending along the rotor axis through the lower rotor shaft, the upper rotor shaft configured to drive the rotation of the pair of top blades and an actuator rod positioned within the upper rotor shaft and coupled to the swashplate, translation of the actuator rod causing the translation of the swashplate. The upper swashplate may be positioned distal to a distal end of the upper rotor shaft.

The present disclosure also describes a method of operating an apparatus including (i) a primary rotor unit having a pair of top blades and a pair of bottom blades arranged in a coaxial counter-rotating configuration and (ii) a plurality of secondary rotors having fixed-pitch blades. The method includes selectively operating the primary rotor unit in only a collective mode with both pairs of blades being deflected equally and a differential collective mode with each pair of blades being deflected by different values and the blades in each pair being equally deflected; and independently controlling the speed of each of the secondary rotors. The method may include adjusting a pitch of the pair of top blades and the pair of bottom blades to adjust a thrust generated by the primary rotor unit and a yaw of the apparatus. The primary rotor unit may be operated at a fixed rotational speed. The method may include adjusting the speed of each of the secondary rotors to adjust a pitch and a roll attitude of the apparatus. The primary rotor unit may be selectively operated in only the collective mode and the differential collective mode for an entirety of a flight period of the apparatus.

The present disclosure also describes an apparatus for aerial transportation of a payload including a primary rotor unit having a pair of top blades and a pair of bottom blades arranged in a coaxial counter-rotating configuration about a rotor axis, the rotor unit selectively capable of rotating only in a collective mode with both pairs of blades being deflected equally and a differential collective mode with each pair of blades of being deflected by different values and the blades in each pair being equally deflected, and a plurality of secondary rotors positioned coupled to a body of the apparatus, the plurality of rotors configured to control maneuvering and orientation of the apparatus. The primary rotor unit may not be capable of cyclic pitch control of the pair of top blades or the pair of bottom blades. The apparatus may further include a plurality of electric motors configured to drive the plurality of secondary rotors, a battery configured to power the motors, and electronic speed controllers for controlling the rotational speed of the plurality of secondary rotors. The plurality of secondary rotors may be fixed-pitch rotors. The primary rotor unit may not be capable of cyclic pitch control of the pair of top blades or the pair of bottom blades. The apparatus may further include a prime mover for driving the primary rotor unit through a gearbox, a lower shaft that couples the pair of bottom blades to the gearbox, and an upper shaft that extends through the lower shaft and couples the pair of top blades to the gearbox. The apparatus may further include a first actuator configured to translate a lower swashplate of the primary rotor unit along the rotor axis to adjust a pitch of the pair of bottom blades, an actuator rod extending through the upper shaft and coupled to an upper swashplate, and a second actuator configured to translate the actuator rod, thereby translating the upper swashplate of the primary rotor unit along the rotor axis to adjust the pitch of the pair of top blades. The upper swashplate may be positioned distal to a distal end of the upper shaft. The apparatus may further include a clutch positioned between the prime mover and the gearbox, the clutch capable of disengaging in case of failure of the prime mover to facilitate auto-rotation.

BRIEF DESCRIPTION OF THE DRAWINGS

The objects and advantages of the present invention will become apparent when the disclosure is read in conjunction with the following figures, wherein.

Figure 1:
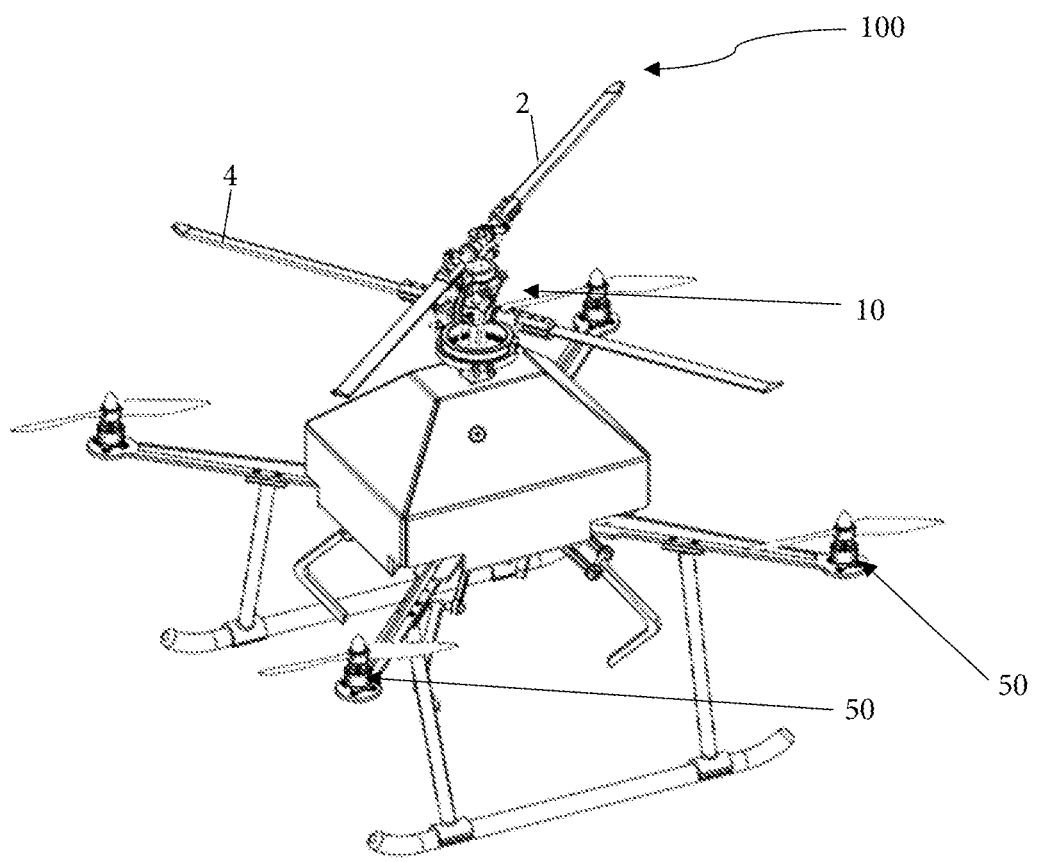
FIG. 1 illustrates a first perspective view of an apparatus for aerial transportation of a payload, in accordance with the present invention.
Figure 2:
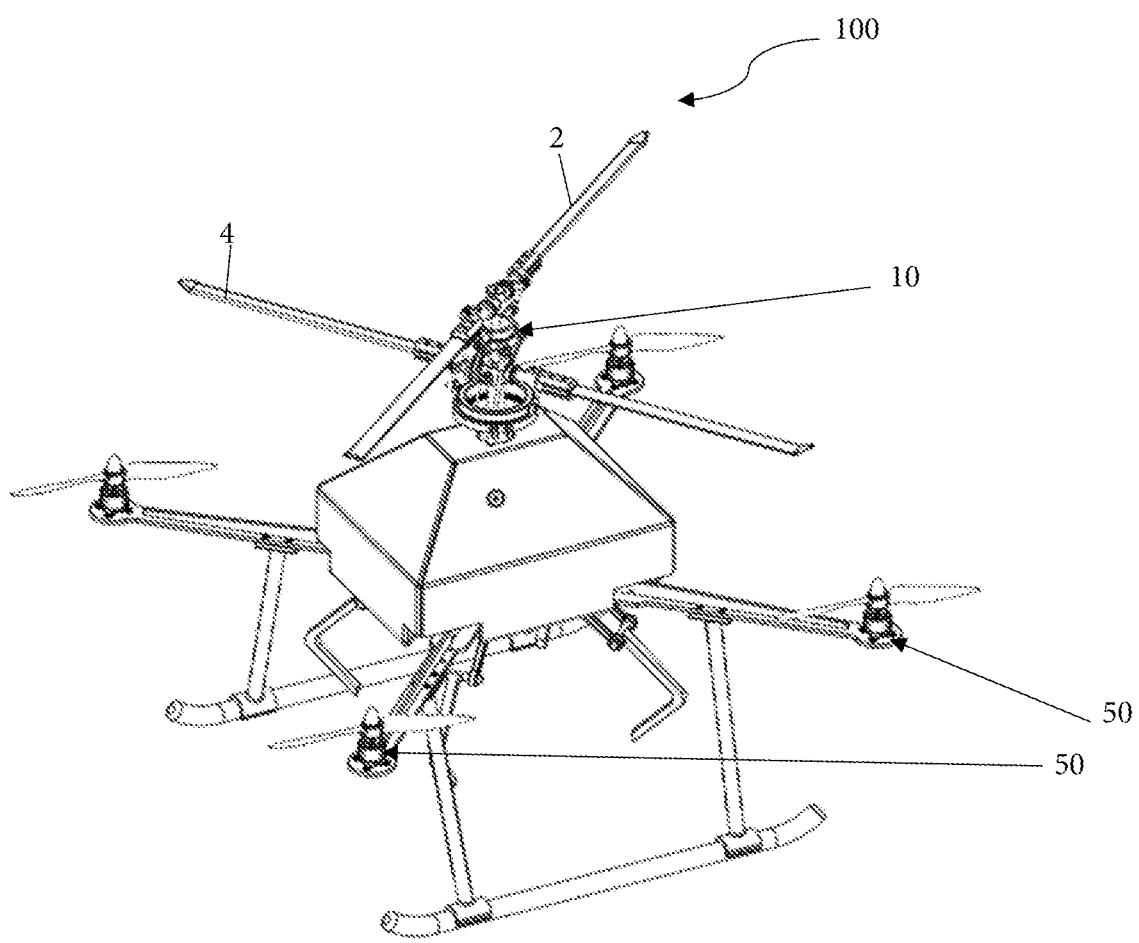
FIG. 2 illustrates a second perspective view of the apparatus for the aerial transportation of the payload of FIG. 1.

It will be recognized that the figures are schematic representations for purposes of illustration. The figures are provided for the purpose of illustrating one or more implementations with the explicit understanding that the figures will not be used to limit the scope of the meaning of the claims.

DETAILED DESCRIPTION

The foregoing objects of the invention are accomplished and the problems and shortcomings associated with prior art techniques and approaches are overcome by the present invention described in the present embodiments.

The present invention provides an apparatus for aerial transportation of a payload. The apparatus facilitates longer flight times. The apparatus is useful for safe transportation of heavier payloads. The apparatus has vertical takeoff and landing capability. The apparatus may employ gasoline as a primary source of energy, which has a higher energy density than lithium polymer batteries.

The present invention is illustrated with reference to the accompanying drawings, throughout which reference numbers indicate corresponding parts in the various figures. These reference numbers are shown in bracket in the following description.

Referring to FIGS. 1-5, an apparatus (100) for aerial transportation of a payload in accordance with the present invention is shown. In an embodiment, the apparatus (100) for the aerial transportation of the payload is a drone. In another embodiment, the apparatus (100) for the aerial transportation of the payload is a drone operating on a technology of a vertical take-off and landing (VTOL).

The apparatus (100) comprises a primary rotor unit (10) (which may also be referred to as a propeller unit), a gearbox (20), a prime mover (30), which may be an internal combustion engine, a clutch (40), a plurality of secondary rotors (50) (which may also be referred to as a plurality of propellers), and an electrical subsystem (not shown). In some embodiments, the prime mover may be an electric motor rather than an engine.

Figure 3:
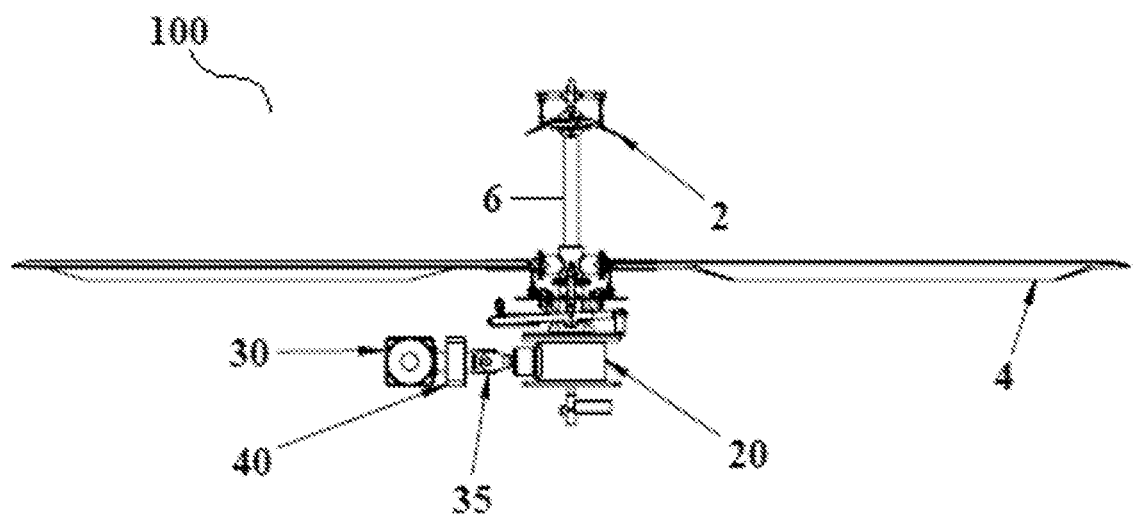
FIG. 3 shows a side view of a rotor unit of the apparatus for the aerial transportation of the payload, in accordance with the present invention.
Figure 4:
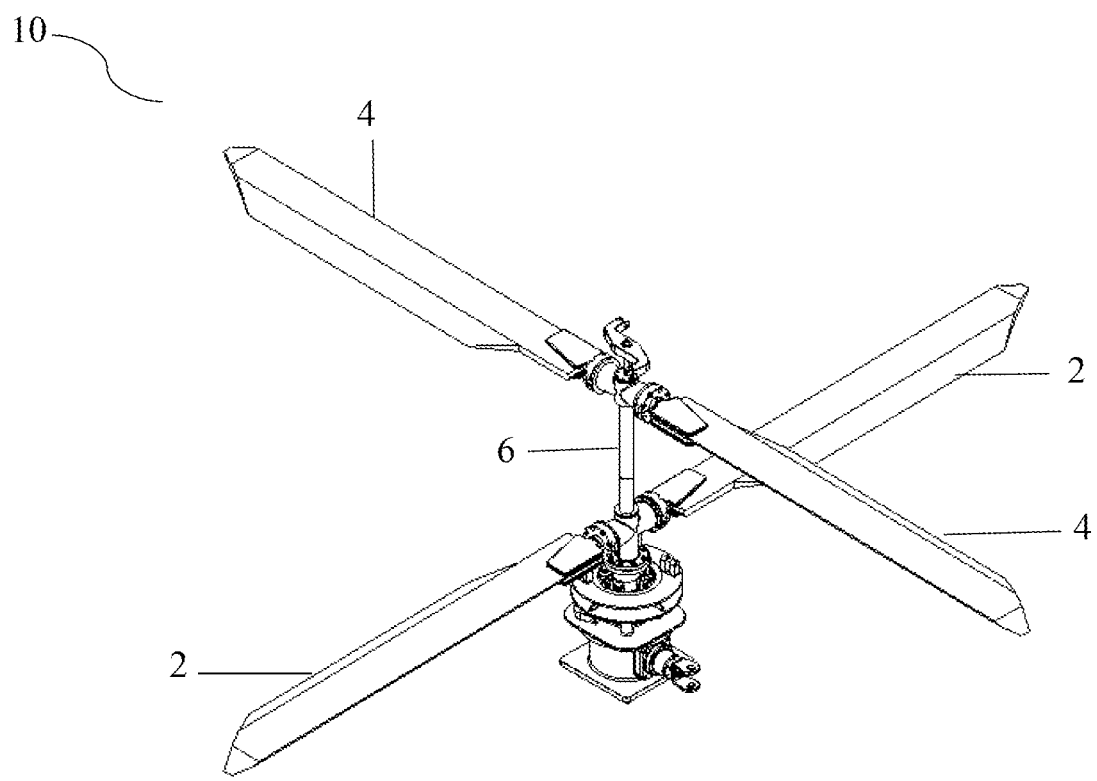
FIG. 4 shows a perspective view of the rotor unit of FIG. 3.
Figure 5:
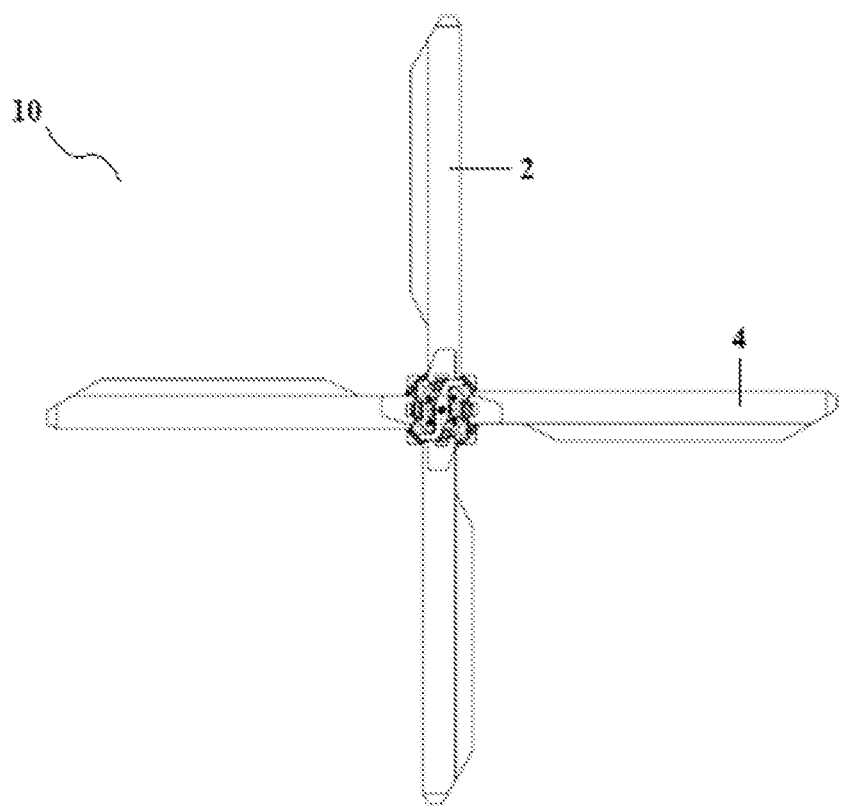
FIG. 5 shows a top view of the rotor unit of FIG. 3.

The propeller unit (10) provides a primary thrust to the apparatus (100) for take-off. As shown in FIGS. 3-5, the propeller unit (10) is a variable pitch twin coaxial counter-rotating propeller unit (10). The propeller unit (10) includes a pair of top blades (2) and a pair of bottom blades (4). Typically, the pair of top blades (2) and the pair of bottom blades (4) in the propeller unit (10) rotate at equal but opposite rotations per minute (rpm). The pair of top blades (2) is connected to the gearbox (20) through an internal shaft (not shown) that is concentric with a shaft (6). Specifically, the pair of top blades (2) and the pair of bottom blades (4) are arranged in a coaxial counter-rotating configuration.

The propeller unit (10) operates in any one of a collective mode and a differential pitch mode. In the collective mode, both pairs of blades (2, 4) are deflected (i.e., pitched) equally. In the differential collective mode, the pair of top blades (2) and the pair of bottom blades (4) are deflected (i.e., pitched) by different amounts/values. The pair of top blades and the pair of bottom blades are not configured to be or capable of being adjusted cyclically, meaning the pitch of the blades does not vary based on the rotational position of the blade. Thus, at all times, each of the top blades is deflected by a first equal amount, and each of the bottom blades may be deflected by a second equal amount. In the collective mode, the first equal amount is equal to the second equal amount. In the differential collective mode, the first equal amount is equal to the second equal amount.

Each pair of blades in the propeller unit (10) is directly driven by the engine (30) through the gearbox (20). In an embodiment, the engine (30) is an internal combustion (IC) engine. As discussed above, in some embodiments, the engine (30) may be replaced by an electric motor. The gearbox (20) includes gears that are selected from bevel gears, planetary gears, and the like. As the propeller unit (10) is directly powered by the IC engine, the full power of the engine (30) is harnessed to produce the primary thrust. Further, the presence of the coaxial counter-rotating configuration of the propeller unit (10) eliminates the need for a tail rotor. The propeller unit (10) may be configured to operate at a constant rotational speed at all times during regular operation (e.g., except when the apparatus (100) is on the ground during activation and deactivation of the propeller unit (10)). Thus, thrust is controlled only by adjusting the pitch of the pair of top blades and the pair of bottom blades. Yaw may also be controlled by adjusting the pitch of the pair of top blades and the pair of bottom blades. For example, the yaw of the apparatus (100) can be adjusted by changing the relative pitches of the pair of top blades (2) and the pair of bottom blades (4) (e.g., in the differential collective mode).

The clutch (40) is positioned between the engine (30) and the gearbox (20). The clutch (40) is connected to the gearbox (20) through a coupling (35). The clutch (40) may be configured to disengage in case of failure of the engine (30) to facilitate auto-rotation thereby enabling a safe descent.

A plurality of propellers (50) (which may also be referred to as rotors) is provided around a frame/body of the apparatus (100). In an embodiment, each of the plurality of propellers (50) is a fixed-pitch propeller powered by a plurality of electric motors (not shown). The plurality of propellers (50) is adapted to help in maneuvering and orientation control. The plurality of propellers (50) is used for roll and pitch control of the apparatus (100), and in some embodiments may also be used to provide yaw control, either alone or in combination with the primary propeller unit (10). In an embodiment, the number of propellers (50) fitted around the body of the apparatus (100) is in a range of 3 to 16. However, it is understood here that the number of propellers (50) fitted around the body of the apparatus (100) may vary in other alternative embodiments of the apparatus (100).

The electrical subsystem consists of a battery (not shown) and electronic speed controllers (not shown). The battery and the electronic speed controllers are used to control the speed of the plurality of propellers (50). In an embodiment, the electrical subsystem is powered by lithium polymer batteries and/or onboard power generation. In another embodiment, the battery is recharged by an alternator (not shown) mounted on-shaft or off-shaft on the engine (30).

In accordance with the present invention, the tasks of primary thrust and control of the apparatus (100) are carried out by two different subsystems that operate in their areas of respective strengths. Specifically, the primary propeller unit (10) may provide primary thrust and yaw control, while the plurality of propellers (50) may provide primary roll and pitch control. Furthermore, the apparatus (100) may employ gasoline, which has a higher energy density than lithium polymer batteries, as a primary source of energy. In other embodiments, the apparatus (100) may be fully electric, with a battery or batteries powering both the primary propeller unit (10) and the plurality of propellers (50).

Again referring to FIG. 1, in an operation, the payload to be transported is attached to the apparatus (100). Specifically, the payload is either slung under the apparatus (100) or carried on a side of the apparatus (100). The payload may be attached to the apparatus (100) by a variety of methods including clamps, hooks, and the like. The apparatus (100) may be fueled with gasoline, which may power the engine to drive the primary propeller unit (10). The engine may also run an alternator causing the battery of the electrical subsystem to get charged. The clutch (40) may be engaged with the engine (30) when the rotational speed engine (e.g., a number of revolutions per minute of a drive shaft of the engine) crosses a threshold. The clutch (40) may then facilitate connection of the gearbox (20) to the engine (30).

The primary thrust of the apparatus (100) may be provided by the propeller unit (10) that is driven directly by the engine (30). The vertical movement of the apparatus (100) may be controlled by adjusting the angle of the pair of top blades (2) and the pair of bottom blades (4). The pair of top blades (2) and the pair of bottom blades (4) may be operated at a constant speed, so that the amount of thrust provided by the propeller unit (10) is not controlled by varying the speed of the blades (2, 4). The pitch of the pair of top blades (2) and the pair of bottom blades (4) may be adjusted to control the yaw of the apparatus (100). The pitch and roll attitude of the apparatus (100) may be controlled by the plurality of electric motors and the plurality of propellers (50) fitted around the body of the apparatus (100). For example, the speed of each of the electric motors may be controlled independently, such that the rotational speed of the plurality of propellers (50) is controlled independently, which may allow for the adjustment of pitch and roll attitude. The payload when transported to a required destination may be released either manually or through a servo release mechanism. In accordance with the present invention, the payload weight capacity of the apparatus (100) depends on the power of the engine (30) and the size of the propeller unit (10).

During descent, the deflection (i.e., pitch) of the blades (2, 4) may be gradually reduced causing the apparatus (100) to slowly descend, while the rotational speed of the blades (2, 4) remains constant. Longitudinal and lateral stability are maintained using the plurality of propellers (50). Once the apparatus (100) has safely landed, the engine (30) is switched off and the electric motors are shut down.

Figure 6:
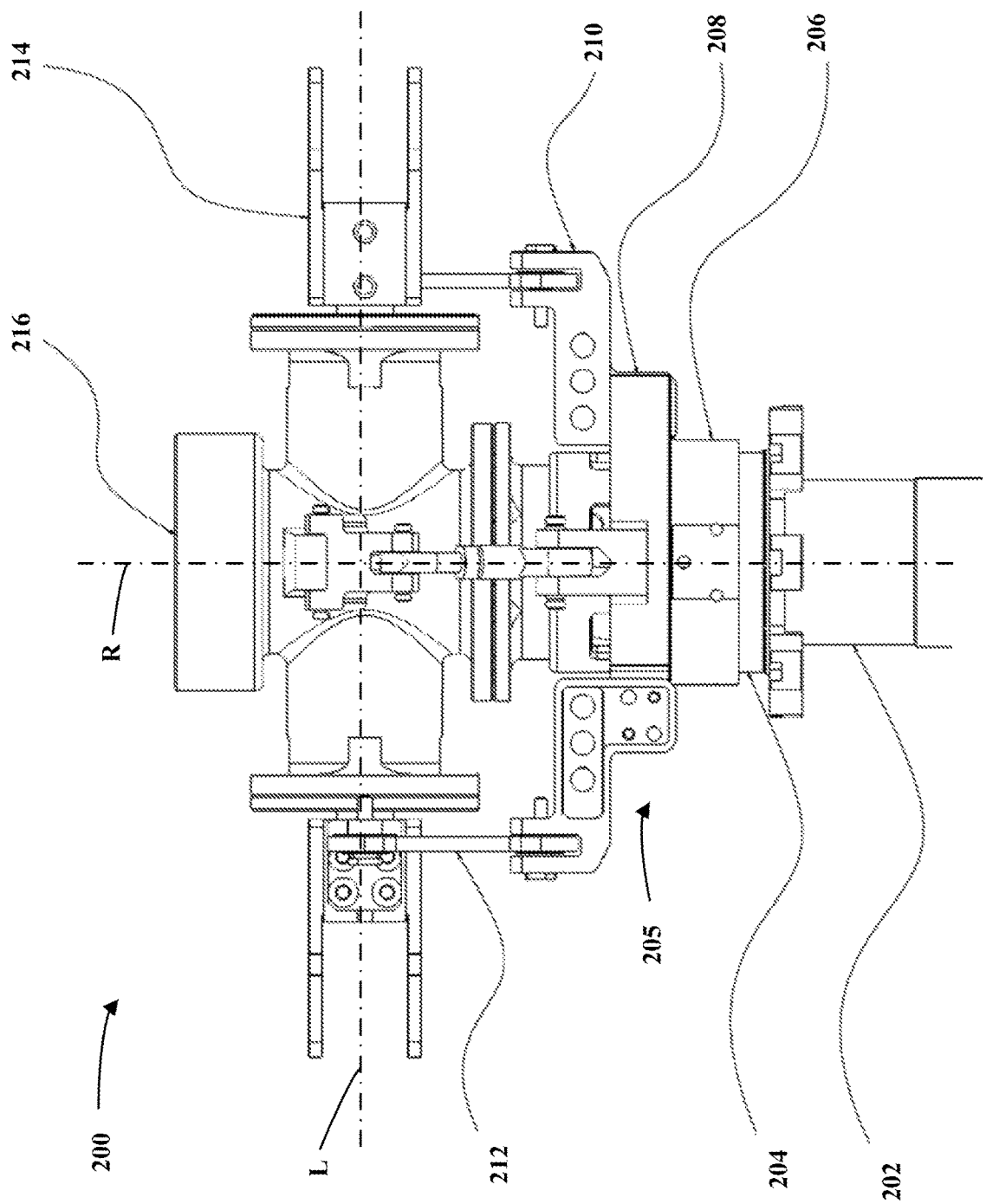
FIG. 6 shows a front view of a lower rotor system of the rotor unit of FIG. 3.
Figure 7:
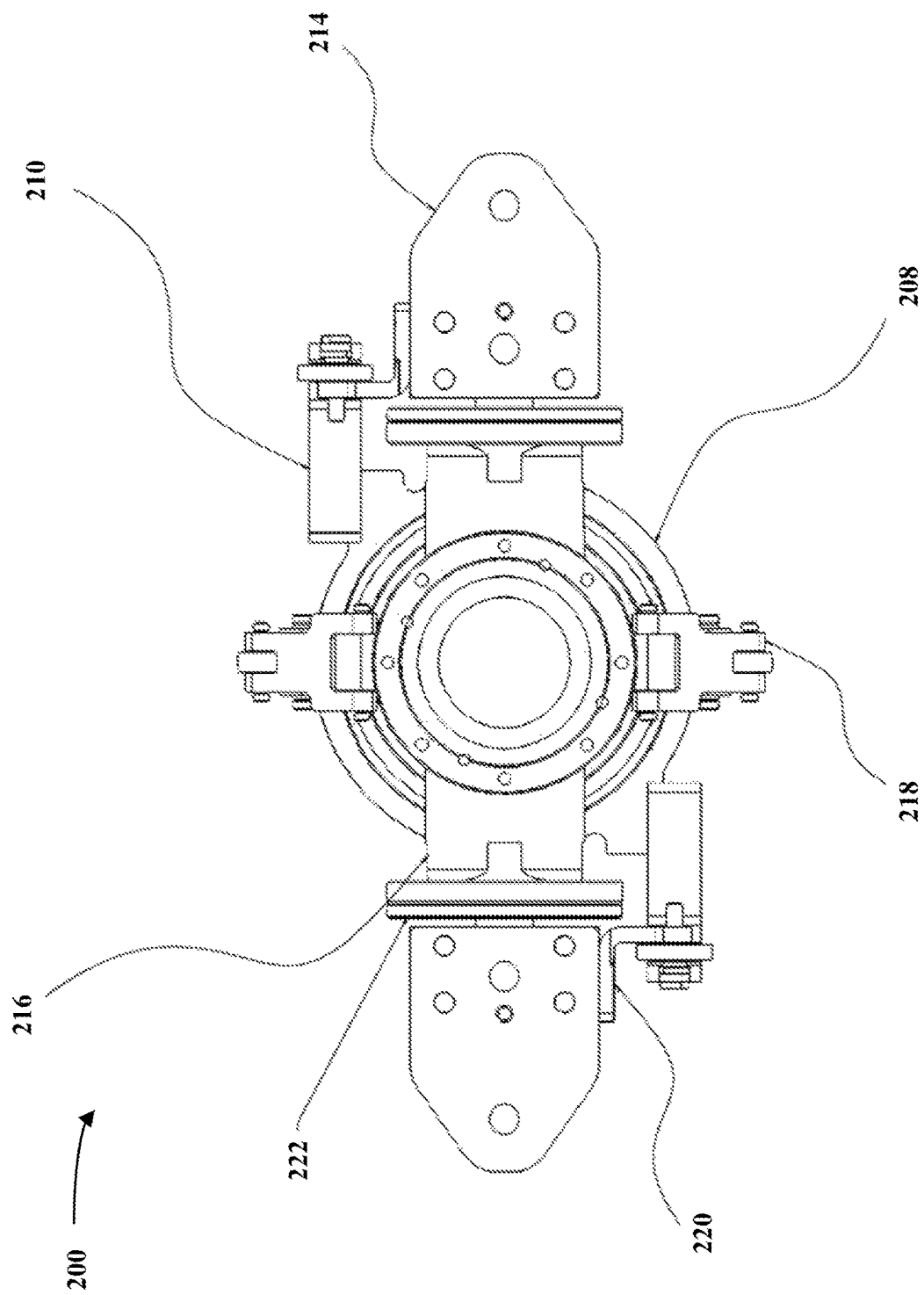
FIG. 7 shows a top view of a lower rotor system of the rotor unit of FIG. 3.
Figure 8:
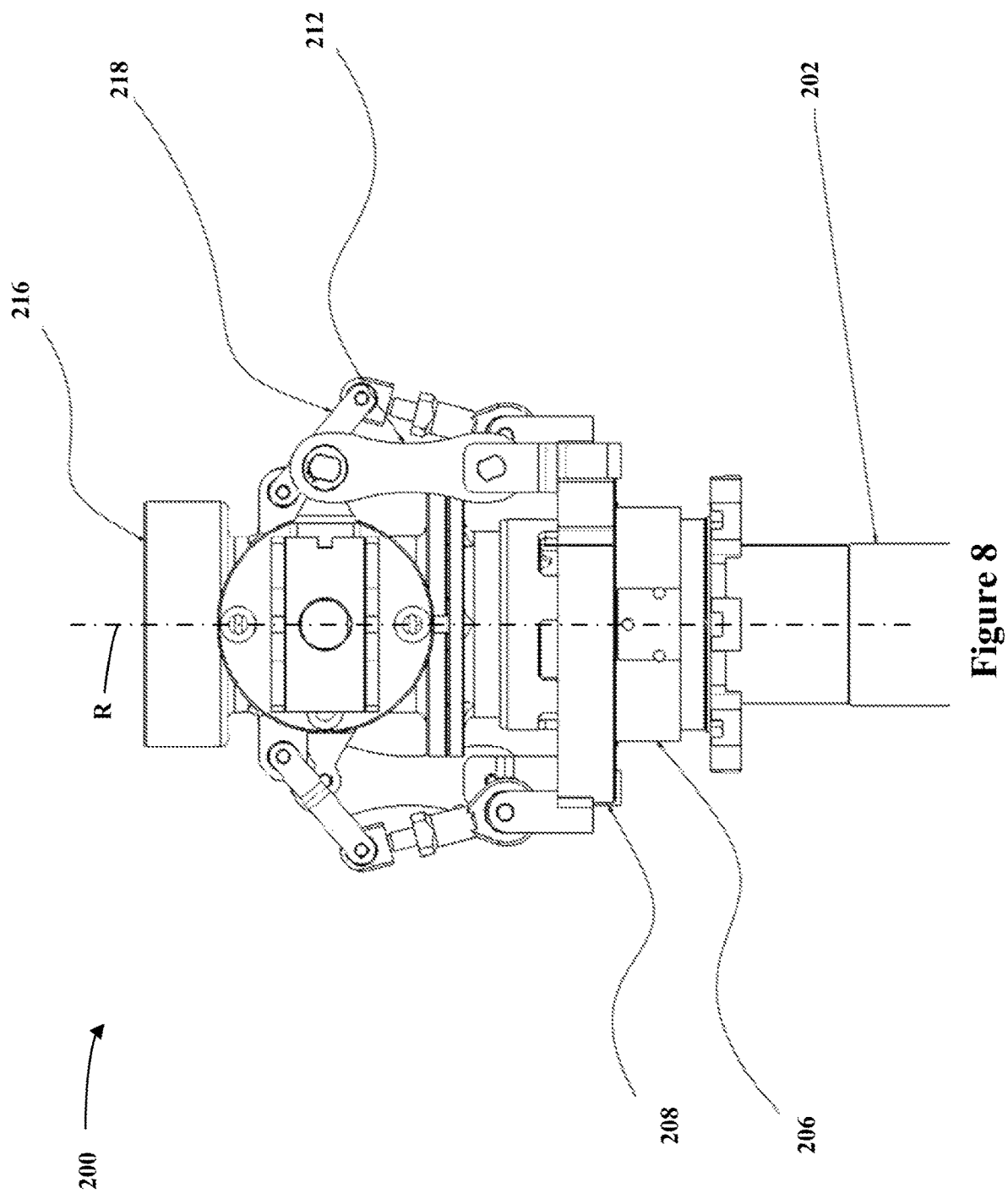
FIG. 8 shows a side view of a lower rotor system of the rotor unit of FIG. 3.
Figure 9:
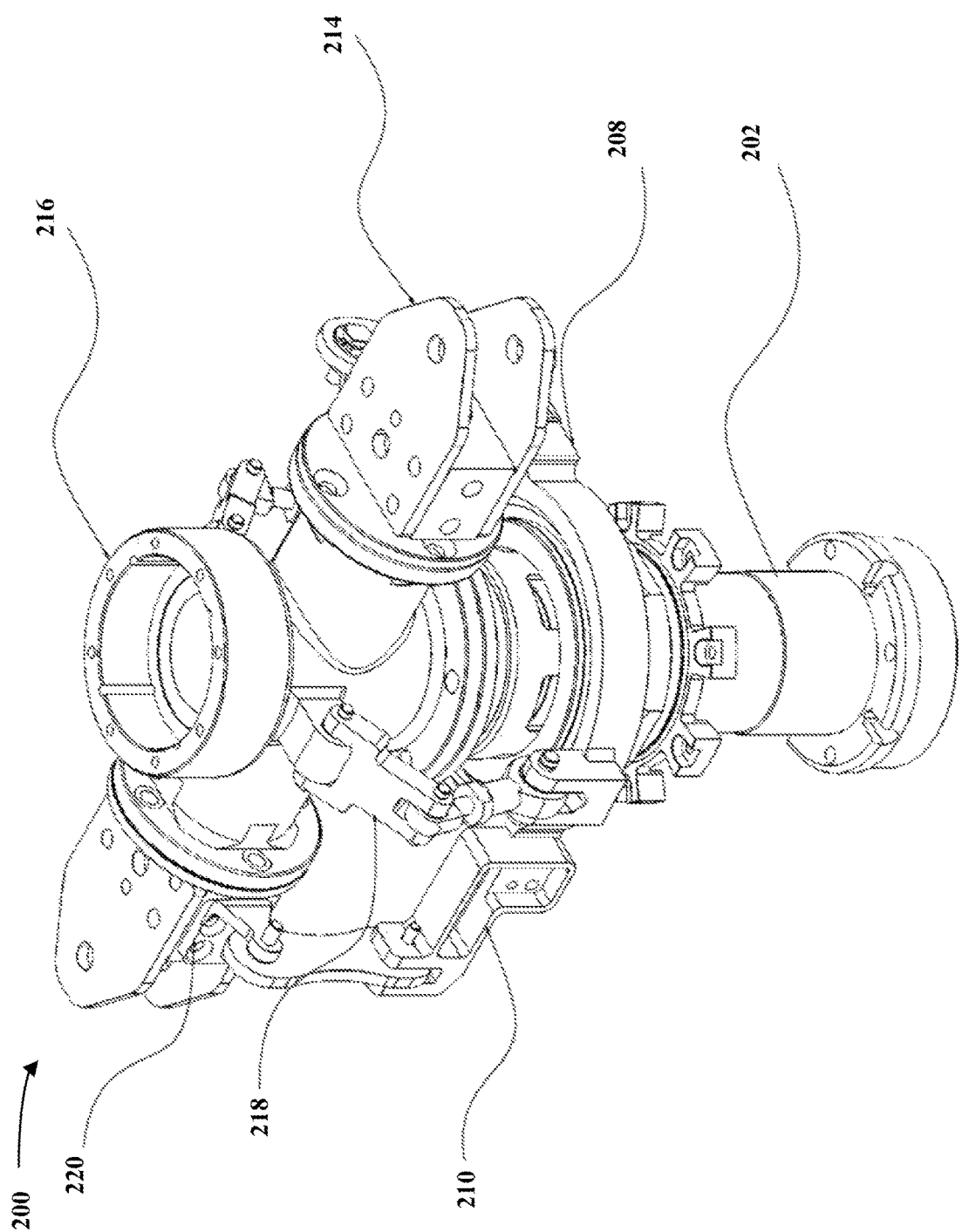
FIG. 9 shows a perspective view of a lower rotor system of the rotor unit of FIG. 3.
Figure 10:
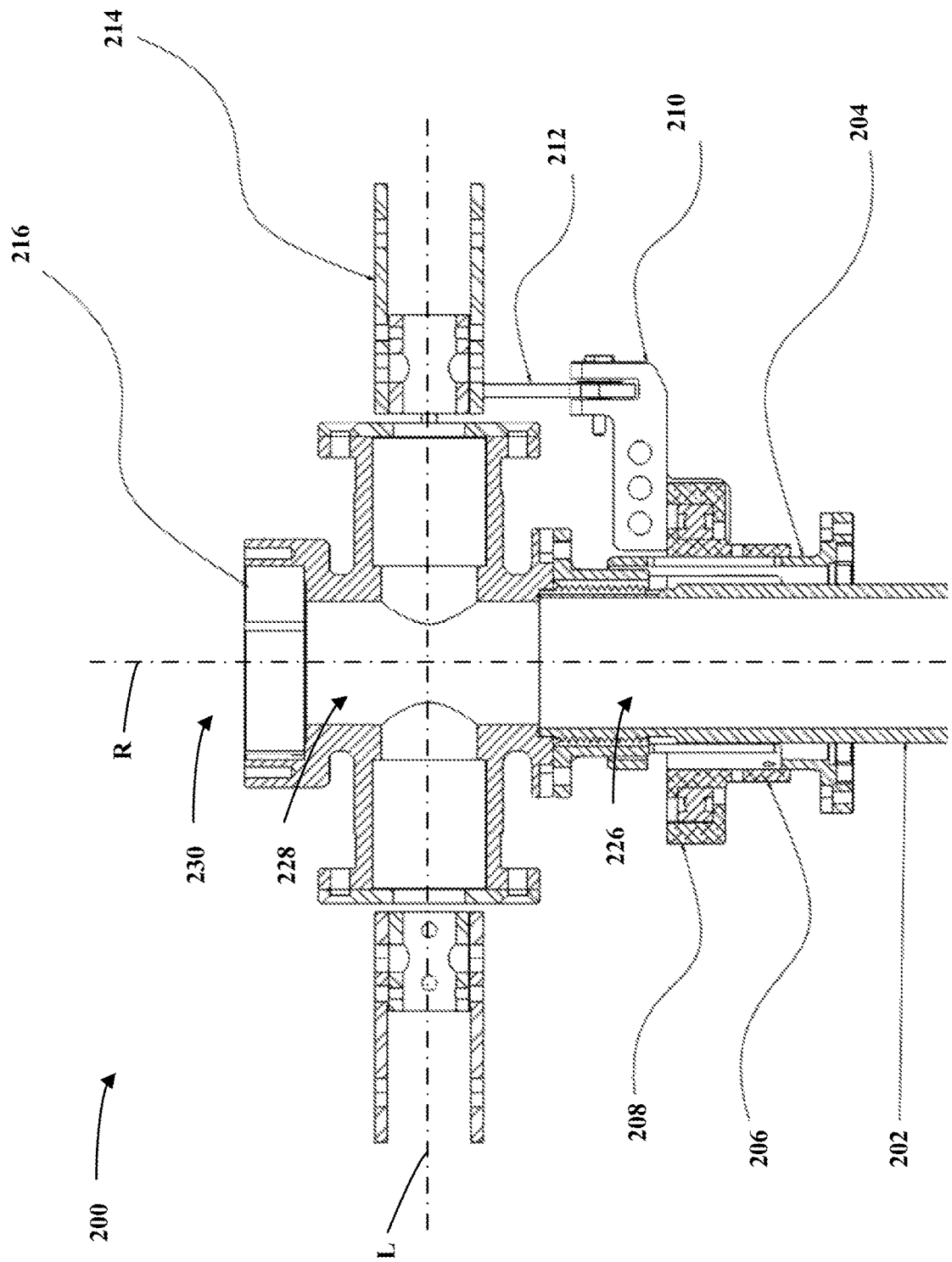
FIG. 10 shows a cross-sectional view of a lower rotor system of the rotor unit of FIG. 3.

Referring now to FIGS. 6-10, a lower rotor system (200) of the apparatus (100) is shown in further detail, according to some embodiments). As used herein "upper" or "distal" refers to farther from the body of the apparatus (100), while "lower" or "proximal" refers to a position closer to the body of the apparatus (100). The lower rotor system (200) may be a subsystem of the primary rotor unit (10). FIG. 6 shows a front view of the lower rotor system (200), FIG. 7 shows a top view of the lower rotor system (200), FIG. 8 shows a side view of the lower rotor system (200), FIG. 9 shows a perspective view of the lower rotor system (200), and FIG. 10 shows a cross-sectional view of the lower rotor system (200). The lower rotor system (200) includes a lower shaft (202) coupled to the gearbox and configured to drive the rotation of a lower rotor hub (216) about a rotor axis (R). The lower rotor hub (216) includes a pair of blade holders (214) to hold the pair of bottom blades (4). The lower blade holders (214) are configured to rotate relative to retainer plates (222) about a lower pitch axis (L) to adjust the pitch of the pair of bottom blades (4). The lower rotor system (200) includes a swashplate guide (204) around which a lower swashplate assembly (205) is arranged. The lower swashplate assembly (205) may also be referred to as a lower swashplate. The swashplate assembly (205) includes a first lower swashplate portion (206) configured to be translated by an actuator along the swashplate guide (204). The first lower swashplate portion (206) does not rotate relative to the body of the apparatus (100). The swashplate assembly (205) includes a second lower swashplate portion (208) slidably coupled to the first lower swashplate portion (206) and configured to rotate with the lower rotor hub (216).

When the actuator causes the first lower swashplate portion (206) to translate along the swashplate guide (204), the first lower swashplate portion (206) causes the second lower swashplate portion (208) to translate as well. The second lower swashplate portion (208) is coupled to a pair of swash arms (210), which are respectively coupled to the pair of blade couplings (214) by a pair of pitch links (212) and a pair of pitch brackets (220). The pair of pitch links (212) is coupled to the lower blade couplings (214) at a location offset from the lower pitch axis (L) of the pitch links (212), such that translation of the second lower swashplate portion (208) causes the lower blade couplings (214) to rotate about the lower pitch axis (L), causing the pitch of the bottom blades (4) to change. The swashplate assembly (205) may only be configured to translate without being configured to tilt. For example, the plane of rotation of the swashplate assembly (205) may remain perpendicular to the rotor axis (R) at all times. As shown in FIGS. 7-9, the lower rotor system (200) may include scissor mechanisms (218) that couple the lower rotor hub (216) to the second lower swashplate portion (208). The scissor mechanisms (218) help ensure that the second lower swashplate portion (208) rotates along with the lower rotor hub (216). Thus, the lower rotor system (200) may not carry out cyclic pitch control of the bottom blades (4), and each of the bottom blades (4) may always have the same pitch as the other. This simplifies the design of the primary rotor unit (10), as additional actuators are not needed to provide cyclic pitch control. The flight control provided to a rotary-wing aircraft by cyclic pitch control (e.g., control of aircraft pitch and roll) may instead be provided by the plurality of secondary rotors (50).

Figure 11:
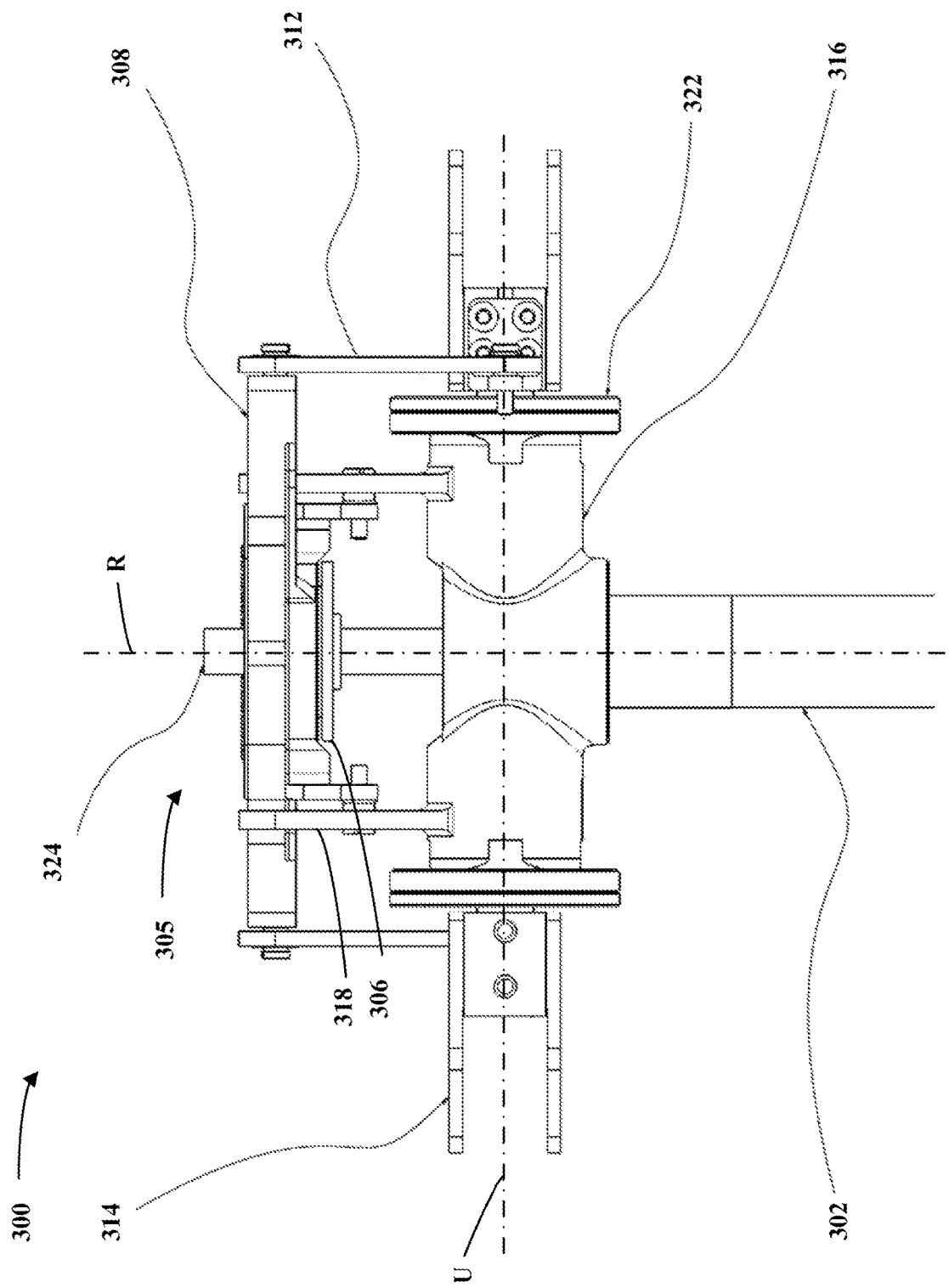
FIG. 11 shows a front view of an upper rotor system of the rotor unit of FIG. 3.
Figure 12:
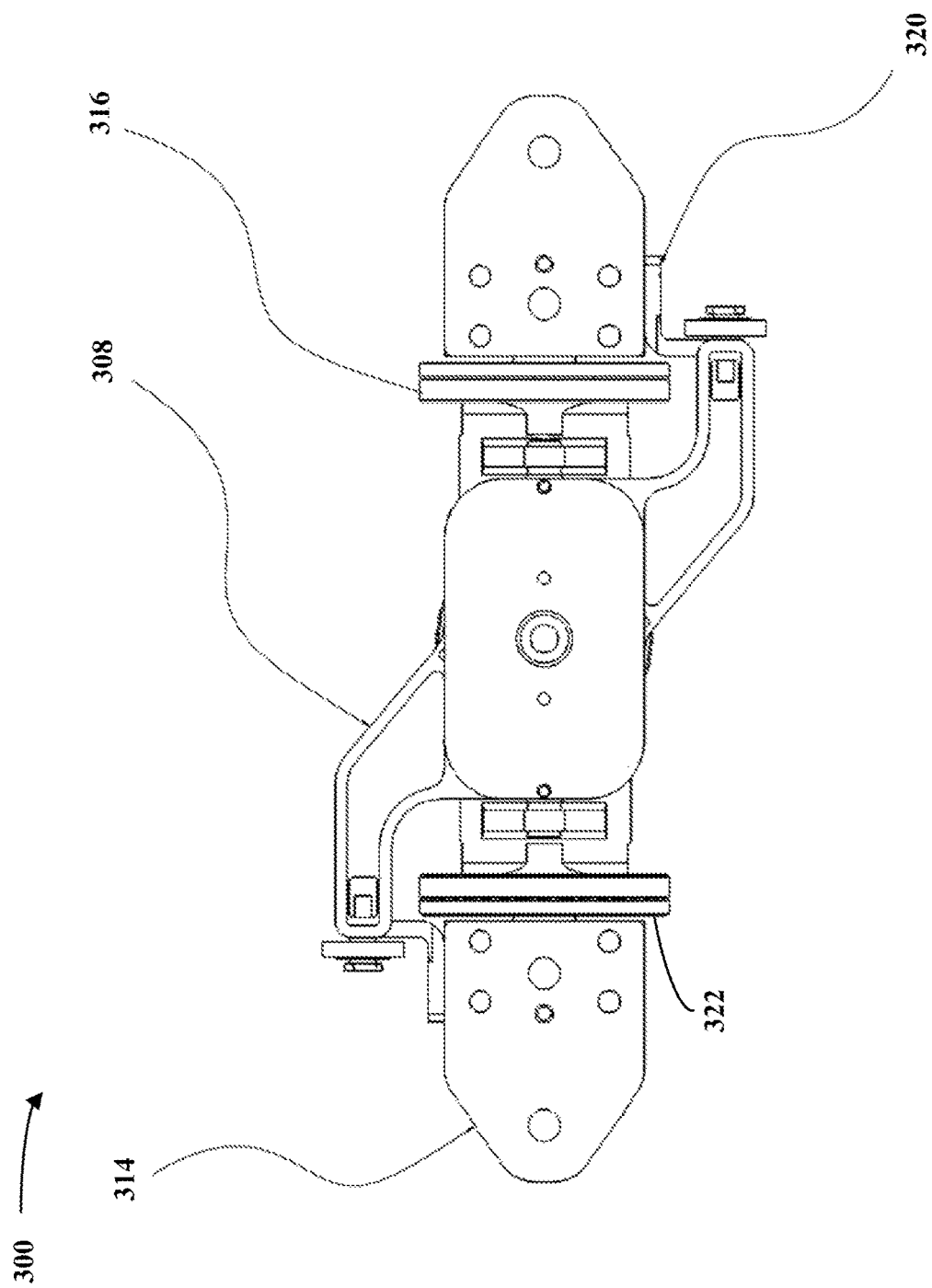
FIG. 12 shows a top view of an upper rotor system of the rotor unit of FIG. 3.
Figure 13:
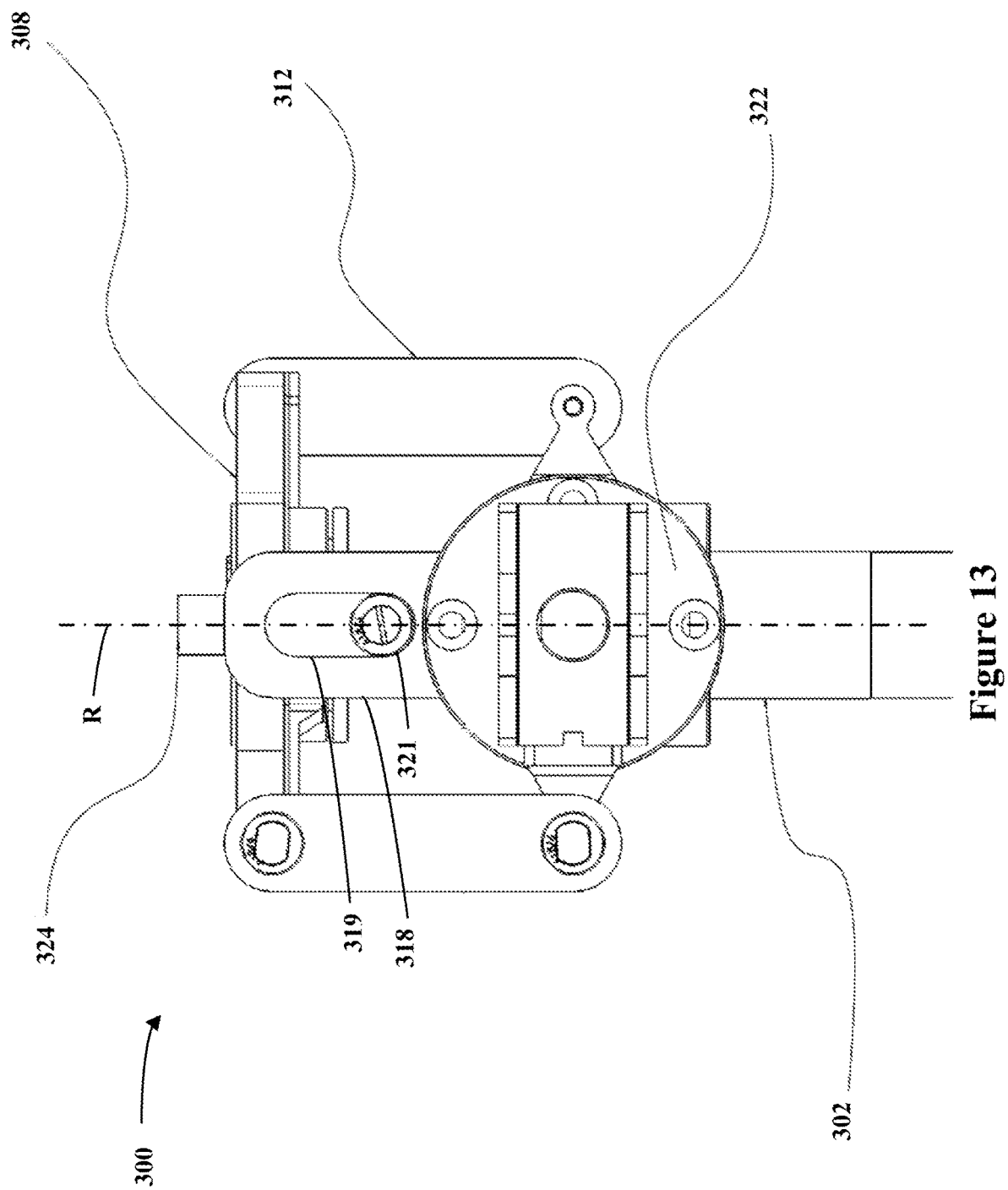
FIG. 13 shows a side view of an upper rotor system of the rotor unit of FIG. 3.
Figure 14:
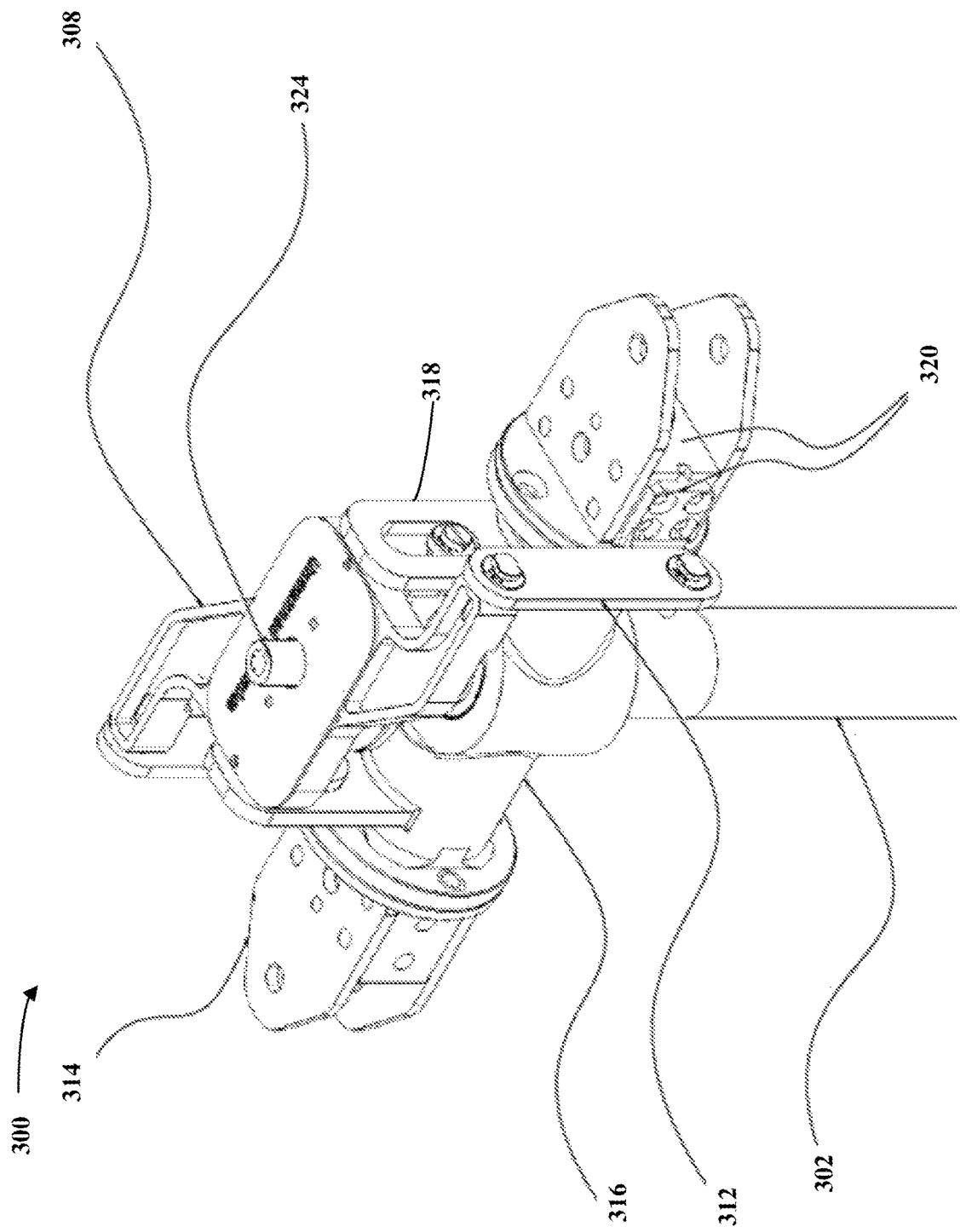
FIG. 14 shows a perspective view of an upper rotor system of the rotor unit of FIG. 3.
Figure 15:
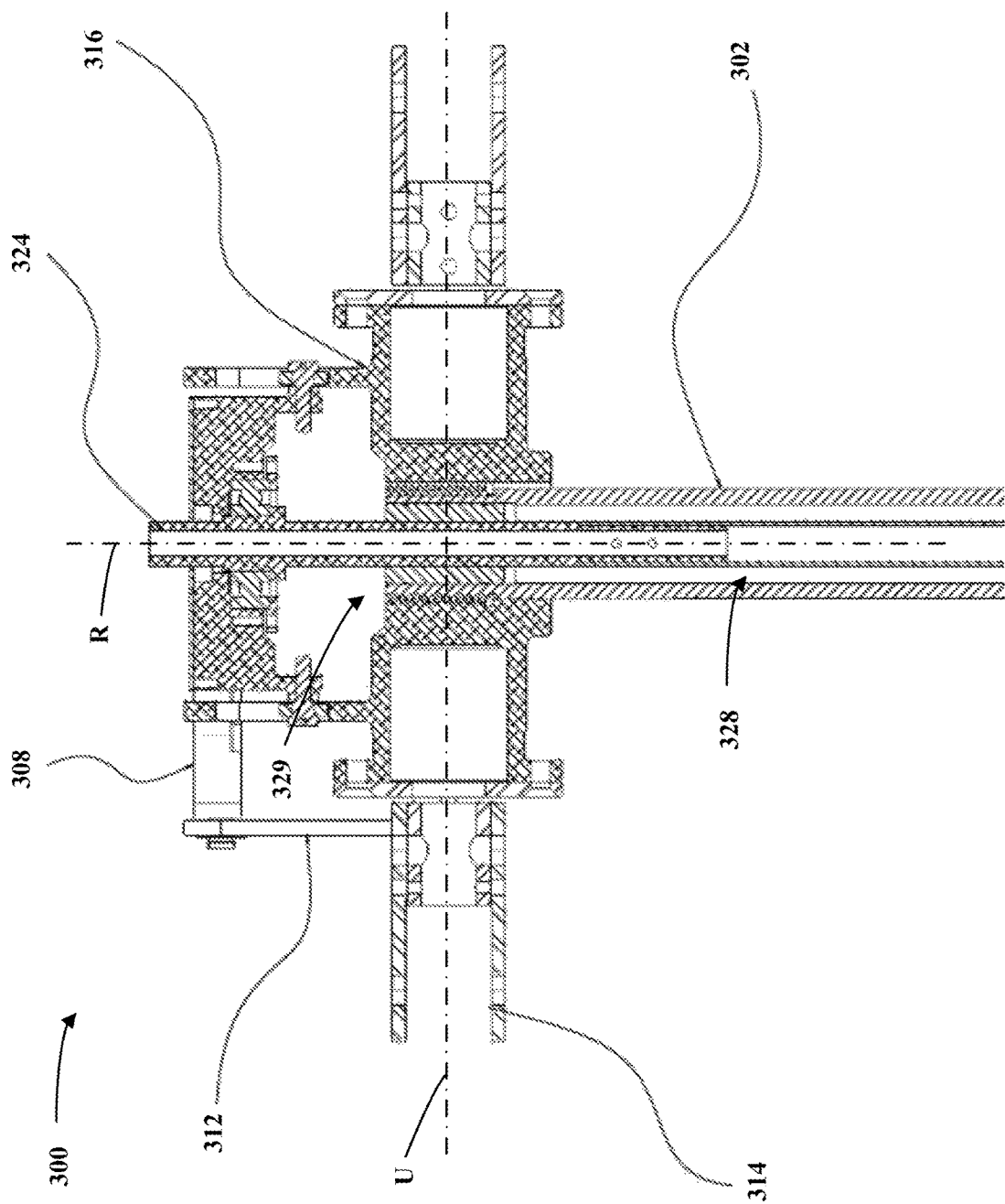
FIG. 15 shows a cross-sectional view of an upper rotor system of the rotor unit of FIG. 3.

Referring now to FIGS. 11-15, an upper rotor system (300) of the apparatus (100) is shown in further detail, according to some embodiments. The upper rotor system (300) may be a subsystem of the primary rotor unit (10). FIG. 11 shows a front view of the upper rotor system (300), FIG. 12 shows a top view of the upper rotor system (300), FIG. 13 shows a side view of the upper rotor system (300), FIG. 14 shows a perspective view of the upper rotor system (300), and FIG. 15 shows a cross-sectional view of the upper rotor system (300). The upper rotor system (300) includes an upper shaft (302) coupled to the gearbox and configured to drive the rotation of an upper rotor hub (316). The upper shaft (302) extends through and is coaxial with the lower shaft (202) of the lower rotor system (200). For example, the lower shaft (202) of the lower rotor system (200) includes a central cavity (226), and the lower rotor hub (216) includes a central hub cavity (228) and an opening (230) at the top of the lower rotor hub (216). The upper shaft (302) extends through the central cavity (226) and the central hub cavity (228) and out of the opening (230), such that the upper rotor hub (316) is positioned above the lower rotor hub (216).

The upper rotor system (300) includes an actuator rod (324) positioned within an inner cavity (328) of the upper shaft (302) and extending from an opening (329) in the distal end of the upper shaft (302). The actuator rod (324) is configured to be translated along the rotor axis (R) by an actuator (e.g., an electric linear actuator, a hydraulic pump, etc.) The actuator rod (324) is coupled at its distal end to an upper swashplate assembly (305) (which may be referred to as an upper swashplate), distal to the upper rotor hub (316) and the distal end of the upper shaft (302). Thus, the translation of the actuator rod (324) along the rotor axis (R) causes the translation of the upper swashplate assembly (305). The actuator rod (324) may be a hollow tube, allowing communication cables to be routed therethrough to the top portion of the apparatus (100).

The upper swashplate assembly (305) includes a first upper swashplate portion (306) fixedly coupled to the actuator rod (324). The first upper swashplate portion (306) does not rotate relative to the body of the apparatus (100). The upper swashplate assembly (306) includes a second upper swashplate portion (308) slidably coupled to the first upper swashplate portion (306). The upper swashplate portion (306) is coupled to the upper rotor hub (316) by a pair of hub couplings (318). The hub couplings (318) each include a slot (319) into which a cam (321) coupled to the upper swashplate portion (306) extends. Thus, the slotted hub couplings (318) transmit rotational force from the upper rotor hub (316) to the upper swashplate assembly (305) while allowing the upper swashplate assembly (305) to translate relative to the upper rotor hub (316).

The upper rotor hub (316) is coupled to a pair of upper blade holders (314) configured to be coupled to the pair of top blades (2). The upper blade holders (314) are coupled to the upper rotor hub (316) via retainer plates (322). The upper blade holders (314) are configured to rotate relative to the retainer plates (322) about an upper pitch axis (U) to adjust the pitch of the pair of top blades (2). When the actuator causes the actuator rod (324) and the upper lower swashplate portion (306) to translate along the rotor axis (R), the first upper swashplate portion (306) causes the second upper swashplate portion (306) to translate as well. The second upper swashplate portion (306) is coupled to the pair of upper blade holders (314) by a pair of pitch links (312). The pair of pitch links (312) is coupled to the upper blade holders (314) at a location offset from the upper pitch axis (U) of the pitch links (312), such that translation of the second upper swashplate portion (308) causes the upper blade holders (314) to rotate about the upper pitch axis (U), causing the pitch of the top blades (2) to change. The swashplate assembly (305) may only be configured to translate without being configured to tilt. For example, the plane of rotation of the swashplate assembly (305) may remain perpendicular to the rotor axis (R) at all times. The hub couplings (318) may help maintain the alignment of the swashplate assembly (305) and help ensure that the second upper swashplate portion (308) rotates along with the upper rotor hub (316). Thus, like the lower rotor system (200), the upper rotor system (300) does not perform cyclic pitch control of the top blades (2), and each of the top blades (2) may always have the same pitch as the other. The primary rotor unit (10) may thus be operated with a constant rotor speed and only in the collective mode and in the differential collective mode as discussed above (e.g., for an entirety of a flight period of the apparatus (100)).

Figure 16:
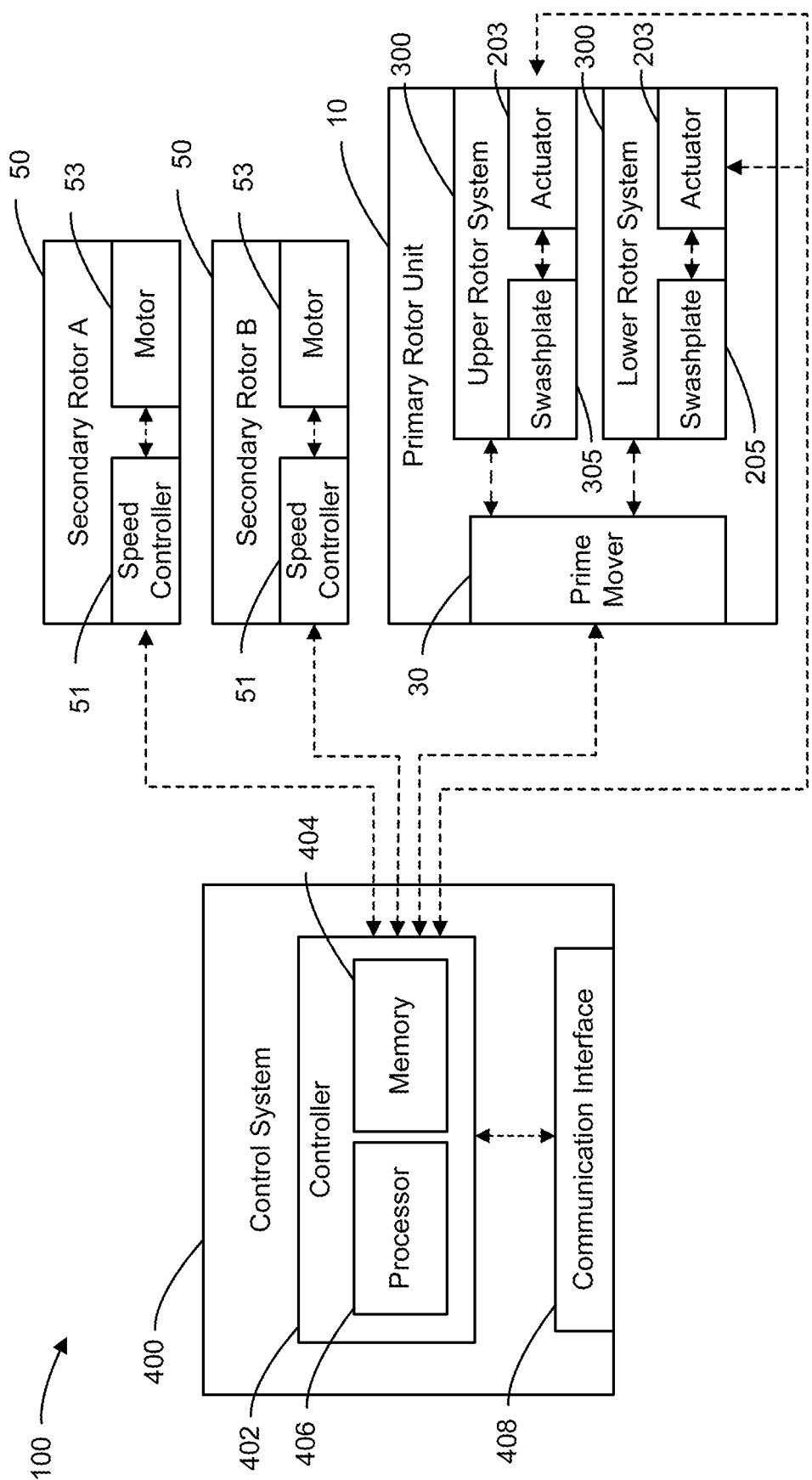
FIG. 16 shows a schematic view of the apparatus of FIG. 1.

Referring now to FIG. 16, a schematic view of the apparatus (100) is shown, according to some embodiments. The apparatus (100) includes a control system (400) including a controller (402) and a communication interface (408). The controller includes at least one memory (404) and at least one processor (406). The at least one memory (404) stores instructions that are executed by the at least one processor (406) to control the apparatus (100). The control system (400) may receive additional instructions via the communication interface (408). For example, the communication interface (408) may receive signals from a remote control operated by a user with instructions for controlling the flight of the apparatus (100). The controller (402) may transmit signals to various components to control the flight of the apparatus (100). The controller (402) is communicatively coupled to the prime mover (30). The controller (402) may transmit a signal causing the prime mover (30) of the primary rotor unit (10) to be activated. This may include, for example starting an engine or turning on a drive motor. The prime mover (30) causes the top blades (2) in the upper rotor system (300) and the bottom blades (4) in the lower rotor system (200) to rotate. Once the prime mover (30) is activated and up to speed, the controller (402) may cause the prime mover (30) to be operated at a constant speed at all times during operation of the apparatus (100) (e.g., aside from an activation period and a deactivation period).

The controller (402) is communicatively coupled to a lower swashplate actuator (203). The controller (402) may transmit a signal causing the lower swashplate actuator (203) to adjust the position of the lower swashplate (205) along the rotor axis (R) to adjust the pitch of the bottom blades (4). The controller (402) is also communicatively coupled to an upper swashplate actuator (303). The controller (402) may transmit a signal causing the upper swashplate actuator (303) to adjust the position of the upper swashplate (305) along the rotor axis (R) to adjust the pitch of the top blades (2). By controlling the pitch of the top and bottom blades (2, 4), the thrust generated by the primary rotor unit (10) can be controlled. The yaw of the apparatus (100) can also be controlled by controlling the pitch of the top and bottom blades (2, 4), for example, by controlling the top blades (2) to have a different pitch than the bottom blades (4). As discussed above, the swashplates (205, 305) may not be capable of tilting to provide cyclic pitch control. In particular, in at least one example, no such tilting is performed by the swashplates, i.e., no cyclic pitch control by tilting is accomplished using the swashplates (205, 305). Accordingly, in such instances, the control system (400) thus is not configured to control other actuators to cause the swashplates (205, 305) to tilt.

The controller (402) is communicatively coupled to a speed controller of a plurality of secondary rotors (50). The controller (402) may transmit signals to a speed controller (51) of each of the secondary rotors (50). The speed controllers (51) control the rotational speed of a respective motor (53) coupled to the blades of a respective secondary rotor (50) to thereby control the rotational speed of the blades. By controlling the blade speeds of each secondary rotor (50) the pitch and roll attitude of the apparatus (100) may be controlled. As discussed above, the secondary rotors (50) may be fixed-pitch rotors. Therefore, the control system (400) may not be configured to control other actuators to cause the pitch of the blades to change. That is, in at least one example, no control is performed by the control system (400) to control the other actuators to cause the pitch of the blades to change. Using the control system (400), the thrust, yaw, roll, and pitch of the apparatus (100) can be controlled by varying only the pitch of the top and bottom blades (2, 4) of the primary rotor unit (10) and the rotational speeds of the secondary rotors (50).

Advantages of the Invention

The apparatus (100) facilitates longer flight times.

The apparatus (100) is useful for safe transportation of higher payloads.

The apparatus (100) has vertical takeoff and land capability.

The primary lift is decoupled from roll and pitch control of the apparatus (100), allowing for gradual and graceful performance degradation when the apparatus (100) is overloaded.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

What is claimed is:

1. A vertical take-off and landing aircraft comprising:
a primary rotor unit having a rotor axis, an upper rotor system, and a lower rotor system, the upper rotor system comprising:

a pair of top blades configured to rotate about the rotor axis;

an upper rotor shaft extending along the rotor axis and configured to drive the rotation of the pair of top blades;

an upper swashplate configured to translate along the rotor axis and not configured to tilt relative to the rotor axis, translation of the upper swashplate causing a pitch of each of the top blades to change equally; and an actuating rod extending along the rotor axis through the upper rotor shaft, translation of the actuating rod configured to control the translation of the upper swashplate;

the lower rotor system comprising:

a lower swashplate configured to translate along the rotor axis and not configured to tilt relative to the rotor axis; and a pair of bottom blades configured to rotate about the rotor axis, translation of the lower swashplate causing a pitch of each of the bottom blades to change equally; and a plurality of secondary rotors each comprising fixed-pitch rotor blades.

2. The vertical take-off and landing aircraft of claim 1, further comprising a controller comprising a processor and a memory storing instructions that, when executed by the processor, cause the controller to control the translation of the upper swashplate and the lower swashplate to control thrust provided by the primary rotor unit and yaw of the aircraft.

3. The vertical take-off and landing aircraft of claim 2, wherein the instructions further cause the controller to independently control the rotational speeds of each secondary rotor to control pitch and roll of the aircraft.

4. The vertical take-off and landing aircraft of claim 2, wherein the instructions further cause the controller to control the primary rotor unit to rotate the pair of top blades and the pair of bottom blades at a constant speed such that the thrust provided by the primary rotor unit is not controlled by adjusting the speed of the pair of top blades and the pair of bottom blades.

5. The vertical take-off and landing aircraft of claim 1, wherein the lower rotor system includes a lower rotor shaft extending along the rotor axis and configured to drive the rotation of the pair of bottom blades, the lower swashplate arranged around the lower rotor shaft, and the upper rotor shaft extends through the lower rotor shaft.

6. The vertical take-off and landing aircraft of claim 5, wherein the upper swashplate is positioned distal to a distal end of the upper rotor shaft.

7. An apparatus for aerial transportation of a payload, the apparatus comprising:

a primary rotor unit having a pair of top blades and a pair of bottom blades arranged in a coaxial counter-rotating configuration about a rotor axis, the rotor unit selectively capable of rotating only in a collective mode with both pairs of blades being deflected equally and a differential collective mode with each pair of blades being deflected by different values and the blades in each pair being equally deflected; and a plurality of secondary rotors positioned coupled to a body of the apparatus, the plurality of rotors configured to control maneuvering and orientation of the apparatus.

8. The apparatus of claim 7, wherein the primary rotor unit is not capable of cyclic pitch control of the pair of top blades or the pair of bottom blades.

9. The apparatus of claim 8, further comprising a plurality of electric motors configured to drive the plurality of secondary rotors, a battery configured to power the motors, and electronic speed controllers for controlling the rotational speed of the plurality of secondary rotors.

10. The apparatus of claim 9, wherein the plurality of secondary rotors are fixed-pitch rotors.

11. The apparatus of claim 10, wherein the primary rotor unit is not capable of cyclic pitch control of the pair of top blades or the pair of bottom blades.

12. The apparatus of claim 11, further comprising:

a prime mover for driving the primary rotor unit through a gearbox;

a lower shaft that couples the pair of bottom blades to the gearbox; and an upper shaft that extends through the lower shaft and couples the pair of top blades to the gearbox.

13. The apparatus of claim 12, further comprising a first actuator configured to translate a lower swashplate of the primary rotor unit along the rotor axis to adjust a pitch of the pair of bottom blades;

an actuator rod extending through the upper shaft and coupled to an upper swashplate; and a second actuator configured to translate the actuator rod, thereby translating the lower swashplate of the primary rotor unit along the rotor axis to adjust a pitch of the pair of top blades.

14. The apparatus of claim 13, wherein the upper swashplate is positioned distal to a distal end of the upper shaft.

15. The apparatus of claim 12, further comprising a clutch positioned between the prime mover and the gearbox, the clutch being configured to disengage responsive to a failure of the prime mover to facilitate auto-rotation.

16. A method of operating the apparatus of claim 7, the method comprising:

selectively operating the primary rotor unit in only the collective mode and the differential collective mode; and independently controlling the speed of each of the secondary rotors.

17. The method of claim 16, further comprising adjusting a pitch of the pair of top blades and the pair of bottom blades to adjust a thrust generated by the primary rotor unit and a yaw of the apparatus.

18. The method of claim 17, wherein the primary rotor unit is operated at a fixed rotational speed.

19. The method of claim 17, further comprising adjusting the speed of each of the secondary rotors to adjust a pitch and a roll attitude of the apparatus.

20. The method of claim 18, wherein the primary rotor unit is selectively operated in only the collective mode and the differential collective mode for an entirety of a flight period of the apparatus.

* * * * *